(12) United States Patent
Tian et al.

(10) Patent No.: US 10,569,860 B2
(45) Date of Patent: Feb. 25, 2020

(54) DETACHABLE PROPELLER HOLDER DEVICE

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

( * ) Notice: Subject to any disclaimer, the term of this patent is extended or adjusted under 35 U.S.C. 154(b) by 212 days.

(21) Appl. No.: 15/854,766

(22) Filed: Dec. 27, 2017

(65) Prior Publication Data

US 2018/0118330 A1   May 3, 2018

(30) Foreign Application Priority Data

Dec. 28, 2016   (CN) ..................... 2016 2 1457513 U (51) Int. Cl.
*B64C 11/10* (2006.01)
*B64C 39/02* (2006.01)
*A63H 27/00* (2006.01)

(52) U.S. Cl.
CPC .............. *B64C 11/10* (2013.01); *A63H 27/12* (2013.01); *B64C 39/024* (2013.01); *B64C 2201/042* (2013.01); *B64C 2201/165* (2013.01)

(58) Field of Classification Search
CPC ......... B64C 11/04; B64C 11/08; B64C 11/10; B64C 27/48; B64C 2201/00; F16B 2/20; F16B 2/22
See application file for complete search history.

(56) References Cited

FOREIGN PATENT DOCUMENTS

EP           3473542 A1 *  4/2019  ............ B64C 11/04

* cited by examiner

*Primary Examiner* — Richard A Edgar (57) ABSTRACT

A detachable propeller holder device includes a propeller holder module, a fixed seat and a motor module. Paddles are located the propeller holder module, a buckling component is located on the propeller holder module, the buckling component includes two elastic arms and two hooks, the two elastic arms are symmetrically located at two sides of the propeller holder module, the hooks are respectively located at an end of the two elastic arms and are respectively buckled with two limit portions which are symmetrically located at the fixed seat, so as to fix the propeller holder module to the fixed seat. In the detachable propeller holder device, only the buckling component at the side of the propeller holder module is pinched by fingers to deform inwardly till the hooks are detached from the limit portions of the fixed seat, and then the propeller holder module is pulled upwardly to be removed.

7 Claims, 9 Drawing Sheets

DETACHABLE PROPELLER HOLDER DEVICE

CROSS REFERENCE OF RELATED APPLICATION

The present invention claims priority under 35 U.S.C. 119(a-d) to CN 201621457513.6, filed Dec. 28, 2016.

BACKGROUND OF THE PRESENT INVENTION

Field of Invention

The present invention relates to a technical field of UAV (unmanned aerial vehicle), and more particularly to a detachable propeller holder device for a UAV.

Description of Related Arts

UAVs are unmanned aerial vehicles operated by radio remote control devices and their own program control devices, and are widely used in many fields such as military, agriculture, forestry, petroleum, electric power and environmental protection. At present, the domestic UAV market is hot, and the UAVs have been gradually expanded from the initial military field to the consumption field. The recognition and demand of UAVs by the general public are also gradually rising.

In the UAV of the prior art, the paddles and the fuselage are integrally formed, the paddles are unable to be disassembled once damaged, only the whole UAV is able to be replaced. Moreover, there are some UAVs in which the propeller holder device is fixed to the motor module through screws. When these UAVs need to be replaced or disassembled, the special assembling and disassembling tool is required, which causes a certain inconveniency in usage.

SUMMARY OF THE PRESENT INVENTION

An object of the present invention is to provide a detachable propeller holder device which is adapted for UAV (unmanned aerial vehicle) and able to be quickly assembled and disassembled, so as to effectively solve the technical problem that the propeller holder device of the UAV is inconvenient for being assembled and disassembled.

To solve the above technical problem, the present invention adopts technical solutions as follows.

A detachable propeller holder device, capable of being quickly assembled and disassembled, comprises a propeller holder module, a fixed seat and a motor module, wherein paddles and a buckling component are located on the propeller holder module, the buckling component comprises two elastic arms and two hooks, the two elastic arms are symmetrically located at two sides of the propeller holder module, the hooks are respectively located at an end of the two elastic arms and are respectively buckled with two limit portions which are symmetrically located at the fixed seat, so as to fix the propeller holder module to an upper portion of the fixed seat.

Preferably, the propeller holder module has a fixed hole, and the buckling component is installed to the fixed hole through a screw.

Preferably, the motor module is fixed with the fixed seat through a press-fit manner, the fixed seat has two screw holes, two paddle fixed shafts respectively pass through the paddles located on the propeller holder module to be connected with the screw holes, so as to fix the propeller holder module to the motor module, a motor of the motor module drives the fixed seat to rotate for driving the propeller holder module to rotate.

Preferably, the fixed seat has a shaft hole in a center thereof, the two screw holes are symmetrically provided at two sides of the shaft hole, a motor limit shaft located in a middle of the motor module passes through the shaft hole of the fixed seat, the fixed seat is fixed to the upper portion of the motor through the motor limit shaft via the screw holes, the motor of the motor module drives the fixed seat to rotate for driving the propeller holder module to rotate.

Preferably, the propeller holder module comprises a base body, a propeller holder upper plate and a propeller holder lower plate are respectively fixed to an upper end and a lower end of the base body, and the paddles are symmetrically fixed at two sides of the base body between the propeller holder upper plate and the propeller holder lower plate.

Preferably, the propeller holder lower plate has a limit hole which matches with the motor limit shaft of the motor module, the motor limit shaft passes through the fixed seat and the propeller holder lower plate in turn and is fixed to the base body.

Preferably, a center which passes through the propeller holder upper plate and the propeller holder lower plate has a limit hole which matches with the motor limit shaft of the motor module, the motor limit shaft passes through the fixed seat, the propeller holder lower plate and the propeller holder upper plate in turn and is fixed to the base body.

Through the above technical solutions, compared with the prior art, the present invention has some advantages and beneficially effects as follows.

The propeller holder module is connected with the motor module through the motor limit shaft, and is fixed with the buckling component through the limit portions of the fixed seat, so that only the buckling component at the side of the propeller holder module is pinched by fingers to deform inwardly till the hooks are detached from the limit portions of the fixed seat, and then the propeller holder module is pulled upwardly to be removed, which is simple in structure and convenient in installation, and has no special tools to assemble and disassemble.

In the drawings, 1: buckling component; 2: screw; 3: fixed seat; 4: motor module; 5: propeller holder module; 6: paddle fixed shaft; 11: elastic arm; 12: hook; 31: fixture block; 32: limit portion; 33: screw hole; 34: shaft hole; 40: motor; 41: motor limit shaft; 51: base body; 52: propeller holder upper plate; 53: propeller holder lower plate; 54: paddle; 55: limit hole; 56: fixed hole.

DETAILED DESCRIPTION OF THE PREFERRED EMBODIMENT

The technical solutions of the present invention are further described in detail with reference to the accompanying drawings and specific embodiments as follows. The advantages and features of the present invention will be clearer based on the following description and the claims. It should be noted that all the accompanying drawings are in a very simplified form and are used at a non-accurate ratio, which is only used for conveniently and clearly helping to illustrate the objects of the embodiments of the present invention.

In a detachable propeller holder device of the present invention, a propeller holder module 5 is connected with a motor module 4 through a motor limit shaft 41; limit portions 32 of a fixed seat 3 are fixed with the buckling component 1 located at the fixed seat 3, so as to fix the propeller holder module 5 with the motor module 4. No special tool is required to assemble and disassemble by users. The propeller holder module 5 is able to press elastic arms 11 located at two sides of the propeller holder module 5, for driving hooks 12 at an end of the elastic arms 11, so as to achieve assembling and disassembling. Therefore, no special tool is required in the present invention. Moreover, the present invention is simple in usage and convenient for being assembled and disassembled.

First Embodiment

Figure 1:
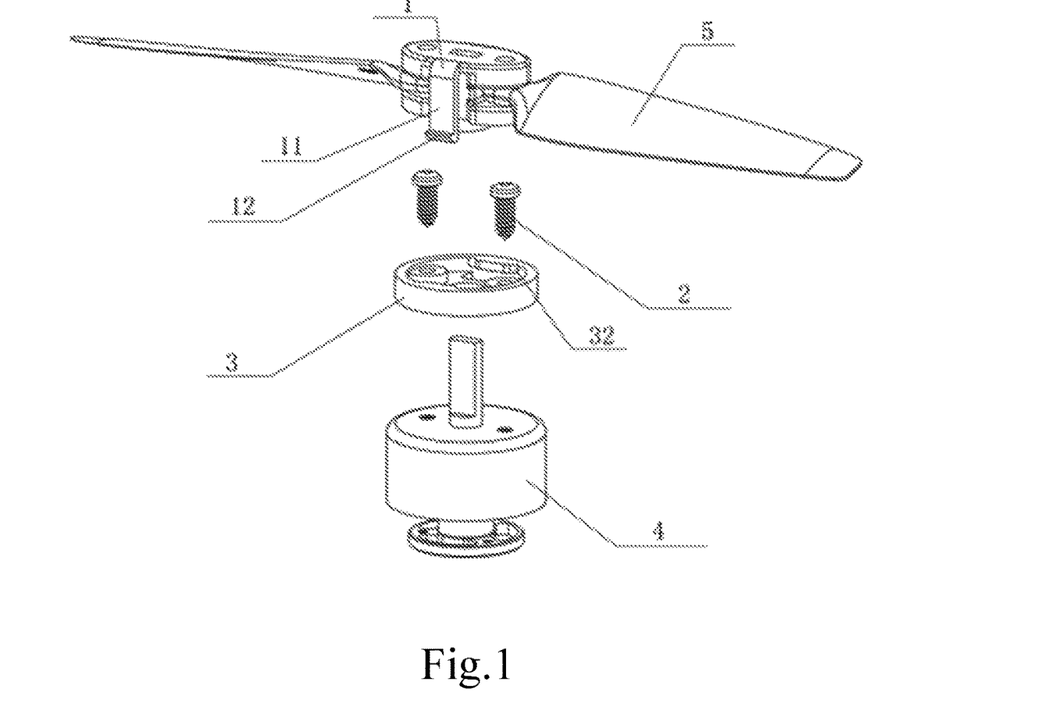
FIG. 1 is a structurally schematic diagram of a detachable propeller holder device for a UAV (unmanned aerial vehicle) according to a first embodiment of the present invention.
Figure 3:
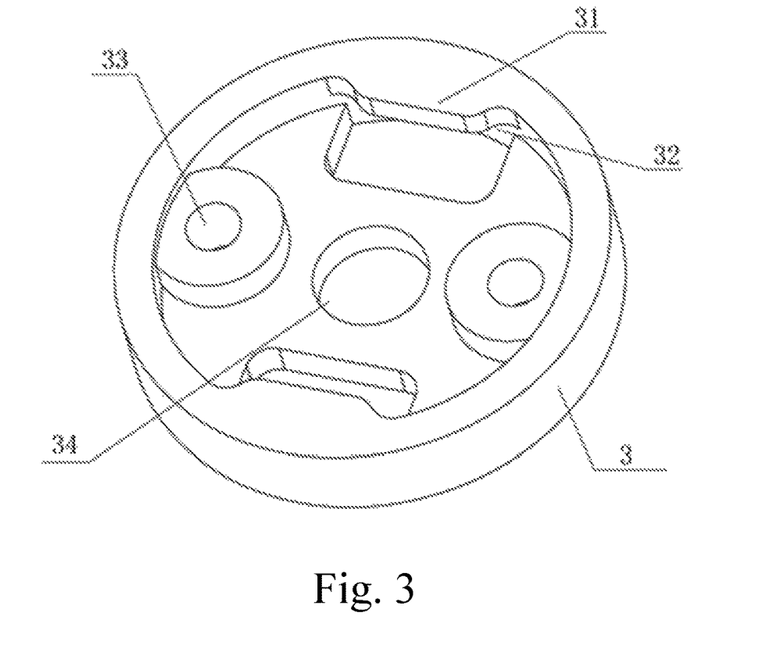
FIG. 3 is a structurally schematic diagram of a fixed seat according to the first embodiment of the present invention.

The present invention is a detachable propeller holder device UAVs (unmanned aerial vehicles) which is able to be quickly assembled and disassembled, comprising a propeller holder module 5 and a fixed seat 3, as shown in FIG. 1, a buckling component 1 is located on the propeller holder module 5 and is able to be made of any materials. The buckling component 1 comprises two elastic arms 11 which are symmetrically located at two sides of the propeller holder module 5 and two hooks 12 which are respectively located at an end of the two elastic arms 11. It can be seen from FIG. 3 that the fixed seat 3 comprises two fixture blocks 31 which respectively symmetrically extends from an edge of an upper surface to a center of the fixed seat 3, in such a manner that the fixture blocks 31 and a sidewall of the fixed seat 3 respectively form two limit portions 32, wherein the two limit portions 32 are symmetrical to each other and respectively corresponding to the hooks 12, the hooks 12 are respectively buckled with the limit portions 32 at two sides of the fixed seat 3, so as to fix the propeller holder module 5 to an upper portion of the fixed seat 3.

Figure 4:
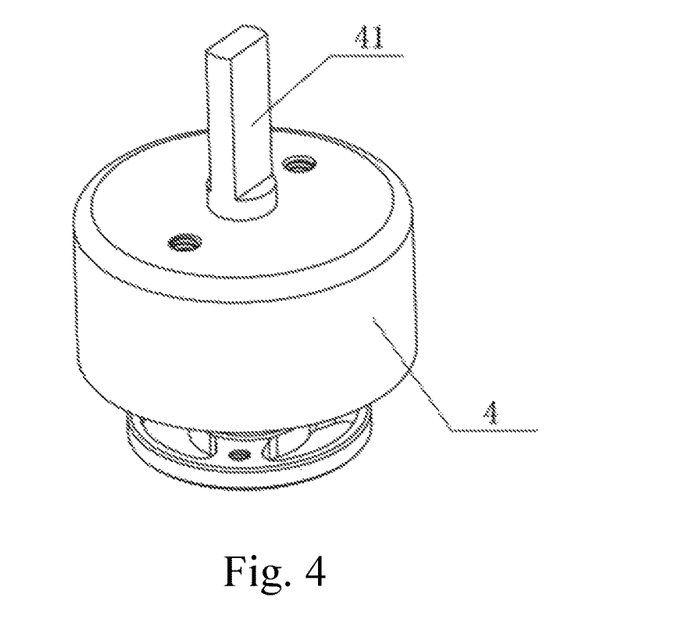
FIG. 4 is a structurally schematic diagram of a motor module according to the first embodiment of the present invention.

A motor module 4 is located below the fixed seat 3. FIG. 4 is a structurally schematic view of the motor module 4. A motor of the motor module 4 drives a motor limit shaft 41 located at a center of the motor module 4 to rotate. The motor limit shaft 41 passes through a shaft hole 34 which is provided in a center of the fixed seat 3, the fixed seat is fixed to an upper portion of the motor module 4 through the motor limit shaft 41 via screw holes 33 in the fixed seat 3, so as to complete the assemble of the fixed seat 3 and the motor module 4.

Figure 2:
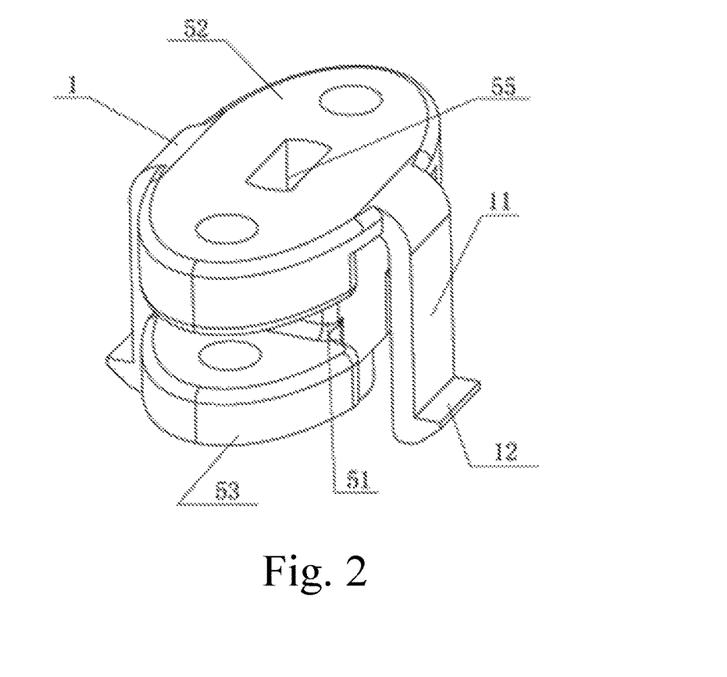
FIG. 2 is structurally schematic diagram of a propeller holder module according to the first embodiment of the present invention.

FIG. 2 is a structurally schematic diagram of the propeller holder module 5. The propeller holder module 5 comprises a base body 51, a propeller holder upper plate 52 and a propeller holder lower plate 53 are respectively fixed at an upper end and a lower end of the base body 51, paddles 54 are symmetrically fixed at two sides of the base body 51 between the propeller holder upper plate 52 and the propeller holder lower plate 53. A limit hole 55 is provided in a center which passes through the propeller holder upper plate 52 and the propeller holder lower plate 53, and the limit hole 55 matches with the motor limit shaft 41 of the motor module 4.

Figure 5:
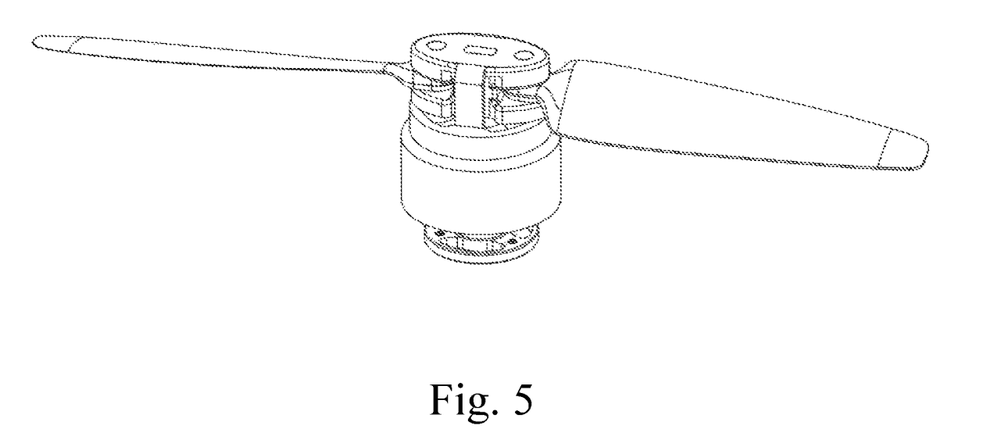
FIG. 5 is a structurally schematic diagram of the detachable propeller holder device after being assembled according to the first embodiment of the present invention.
Figure 6:
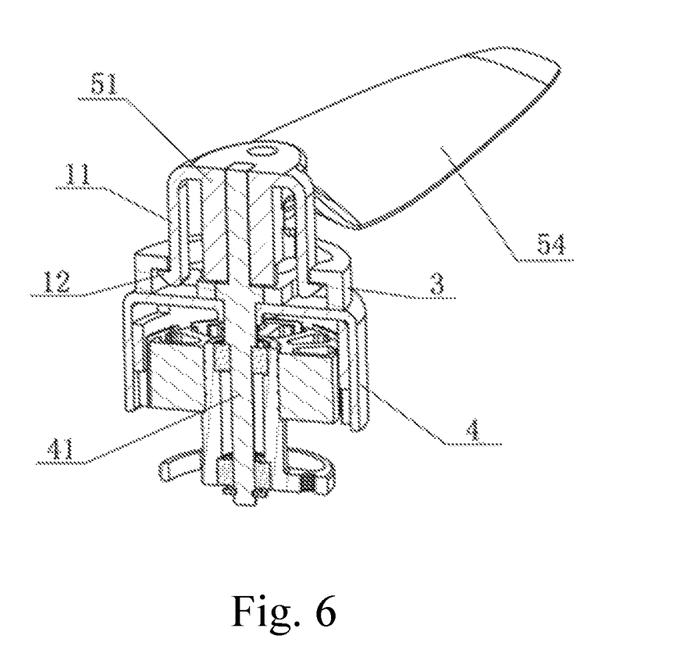
FIG. 6 is an axially sectional view of the detachable propeller holder device after being assembled according to the first embodiment of the present invention.
Figure 7:
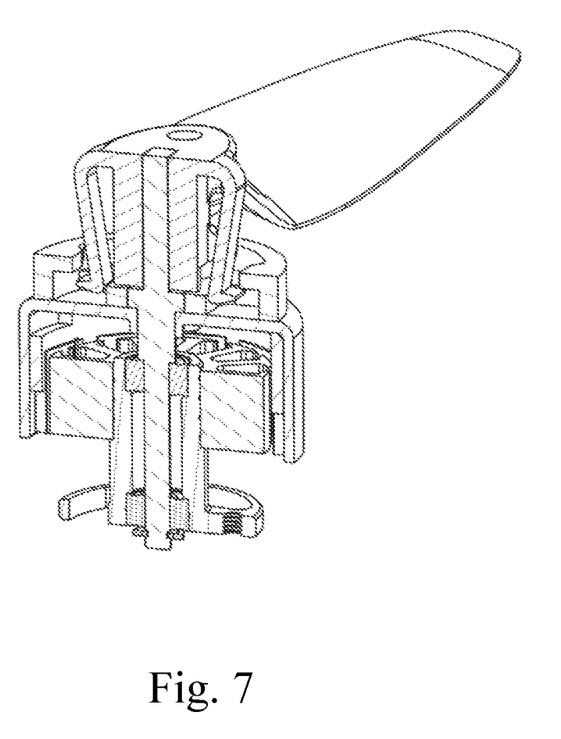
FIG. 7 is an axially sectional view of the detachable propeller holder device while being pressed according to the first embodiment of the present invention.

While being installed, the propeller holder module 5 is directly inserted into the motor module 4 mounted with the fixed seat 3 from top to bottom, the motor limit shaft 41 passes through the fixed seat 3, the propeller holder lower plate 53 and the propeller holder upper plate 52 in turn and is fixed to the base body 51, so as to limit the horizontal rotation of the propeller holder module 5. The buckling component 1 is fixed to the two sides of the propeller holder module 5, the two elastic arms 11 of the buckling component 1 occur a certain deformation till the hooks 12 are respectively buckled with the limit portions 32 of the fixed seat 3 in position; and at this time, the cooperation between the hooks 12 and the limit portions 32 of the fixed seat 3 is able to limit the propeller holder module 5 to move upwardly and downwardly. FIGS. 5 and 6 are schematic views of the present invention after being assembled. When the present invention is disassembled, the elastic arms 11 at the sides of the propeller holder module 5 are pinched to deform inwardly for detaching the hooks 12 from the limit portions 32, and then the propeller holder module 5 is pulled upwardly to be removed. FIG. 7 shows the disassembling process of the propeller holder module 5.

Second Embodiment

Figure 8:
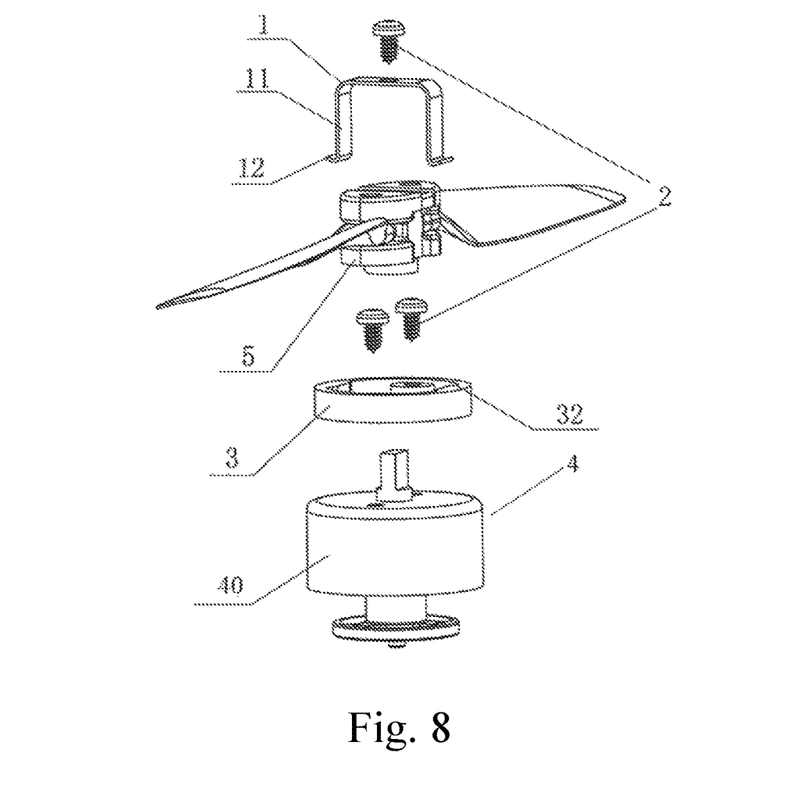
FIG. 8 is a structurally schematic diagram of a detachable propeller holder device according to a second embodiment of the present invention.

FIG. 8 is a structurally schematic diagram a propeller holder device according to a second embodiment of the present invention. It can be seen from FIG. 8 that the structure and the principle of the second embodiment are basically same as those of the first embodiment, both of which utilize the bucking component 1 and the limit portions 32 of the fixed seat 3 to achieve locking or unlocking. Differences between the first embodiment and second embodiment are as follows. In the first embodiment, the buckling component 1 and the propeller holder module 5 are integrally formed, and in the second embodiment, the buckling component 1 is fixed to a top portion of the propeller holder module 5 through screws or other fixing manners, which is illustrated through taking the screws as an example in the drawings.

To cooperate with the buckling component 1, the structure of the propeller holder module 5 and the motor module 4 varies accordingly, the structure of the fixed seat 3 is unchanged; and similarly, the buckling component 1 comprises two elastic arms 11 which are symmetrically located at two sides of the propeller holder module 5 and two hooks 12 which are respectively located at an end of the two elastic arms 11, the hooks 12 are respectively buckled with the limit parts 32 which are located at two sides of the fixed seat 3, so as to fix the propeller holder module 5 to an upper portion of the fixed seat 3.

Figure 9:
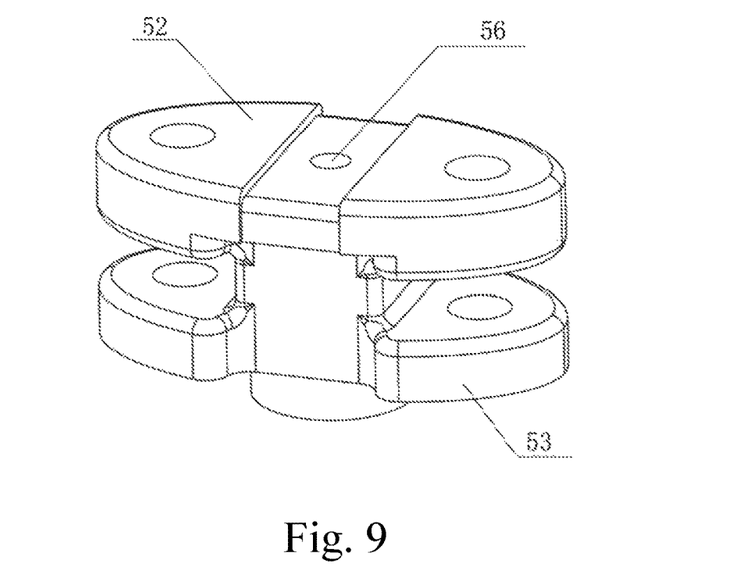
FIG. 9 is structurally schematic diagram of a propeller holder upper plate according to the second embodiment of the present invention.
Figure 10:
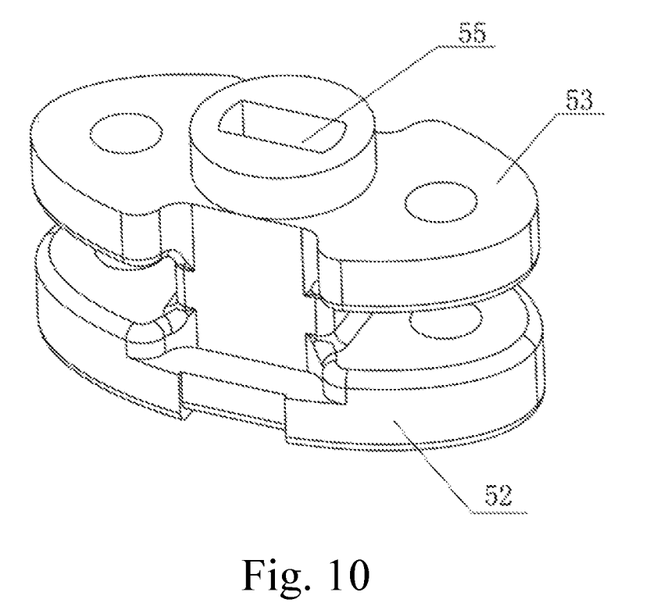
FIG. 10 is a structurally schematic diagram of a propeller holder lower plate according to the second embodiment of the present invention.
Figure 11:
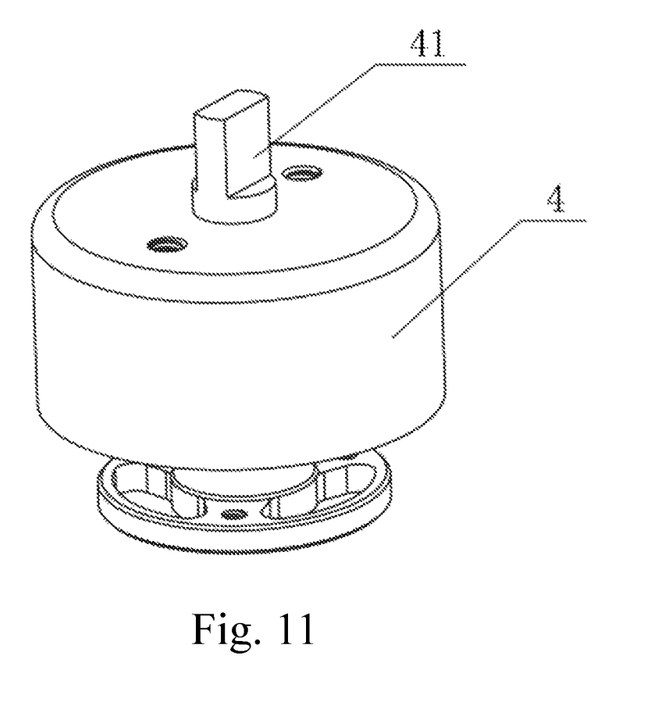
FIG. 11 is a structurally schematic diagram of a motor module according to the second embodiment of the present invention.

FIG. 2 is a structurally schematic view of the propeller holder module provided by the present invention, wherein the propeller holder module 5 comprises a base body 51, a propeller holder upper plate 52 and a propeller holder lower plate 53 are respectively fixed to an upper end and a lower end of the base body 51, paddles 54 are symmetrically fixed to two sides of the base body 51 between the propeller holder upper plate 52 and the propeller holder lower plate 53, a fixed hole 56 is provided in a middle of a top portion of the propeller holder upper plate 52, as shown in FIG. 9, the buckling component 1 is installed to the fixed hole 56 through screws 2; a limit hole 55 is provided in a middle of the propeller holder lower plate 53, as shown in FIG. 10, the limit hole 55 matches with the motor limit shaft 41 of the motor 4, in such a manner that the motor limit shaft 41 passes through the fixed seat 3 and the propeller holder lower plate 53 and is fixed to the base body 51, so that a length of the motor limit shaft 41 matches with a depth of the limit hole 55 of the propeller holder lower plate 53. FIG. 11 is a structurally schematic diagram of the motor module 4.

Figure 12:
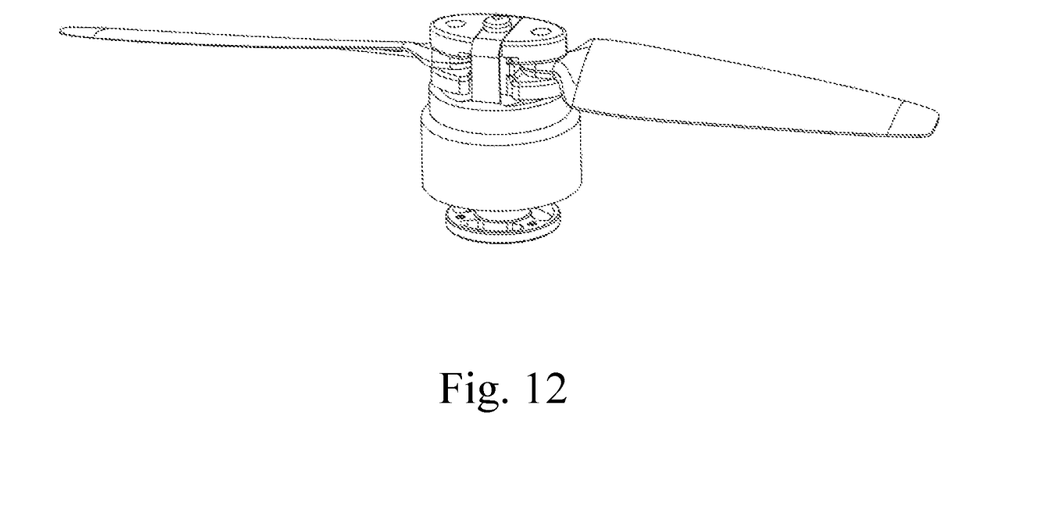
FIG. 12 is a structurally schematic diagram of the detachable propeller holder device after being assembled according to the second embodiment of the present invention.
Figure 13:
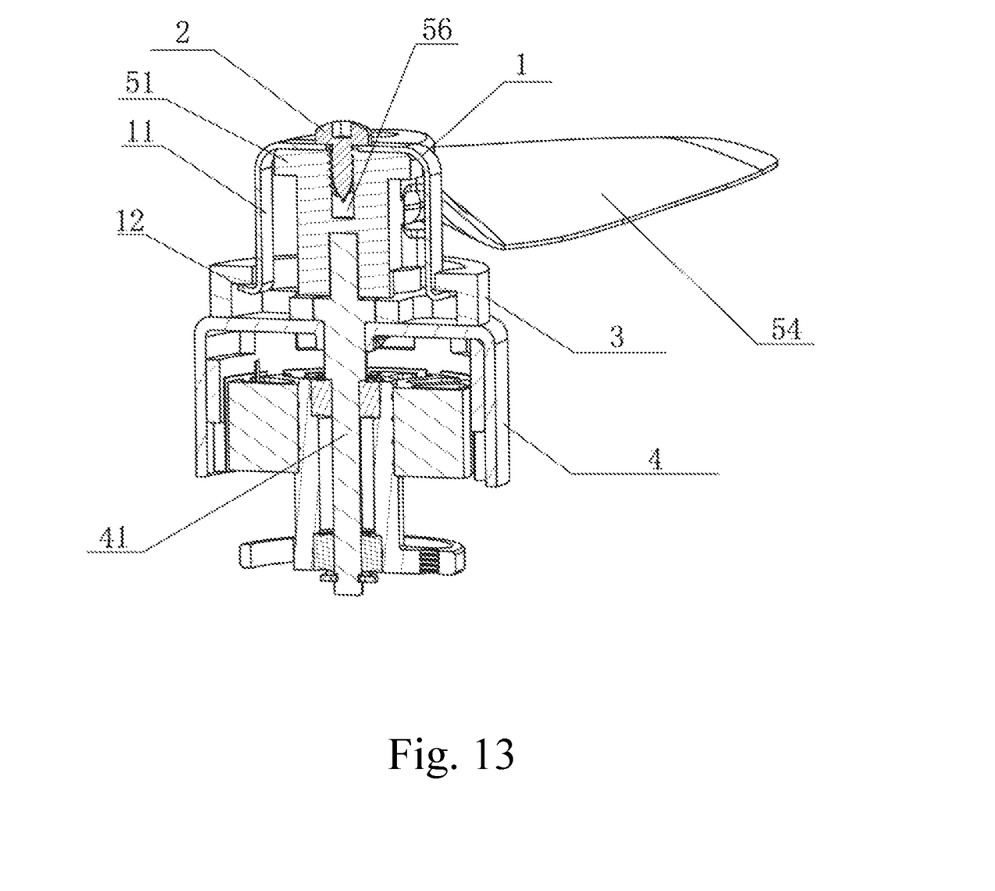
FIG. 13 is an axially sectional view of the detachable propeller holder device after being assembled according to the second embodiment of the present invention.

While being installed, the propeller holder module 5 is directly inserted into the motor module 4 installed with the fixed seat 3 from top to bottom, the motor limit shaft 41 passes through the fixed seat 3 and the propeller holder lower plate 53 and is fixed to the base body 51, so as to limit the horizontal rotation of the propeller holder module 5; the buckling component 1 is fixed with an upper end of the propeller holder module 5, the elastic arms 11 at the two sides of the buckling component 1 occur a certain deformation till the hooks 12 are respectively buckled with the limit portions 32 of the fixed seat 3 in position; and at this time, the cooperation between the hooks 12 and the limit portions 32 of the fixed seat 3 is able to limit the propeller holder module 5 to move upwardly and downwardly. FIGS. 12 and 13 are schematic views of the present invention after being assembled. When the present invention is disassembled, as same as the first embodiment, the elastic arms 11 at the sides of the propeller holder module 5 are pinched to deform inwardly for detaching the hooks 12 from the limit portions 32, and then the propeller holder module 5 is pulled upwardly to be removed.

Third Embodiment

Figure 14:
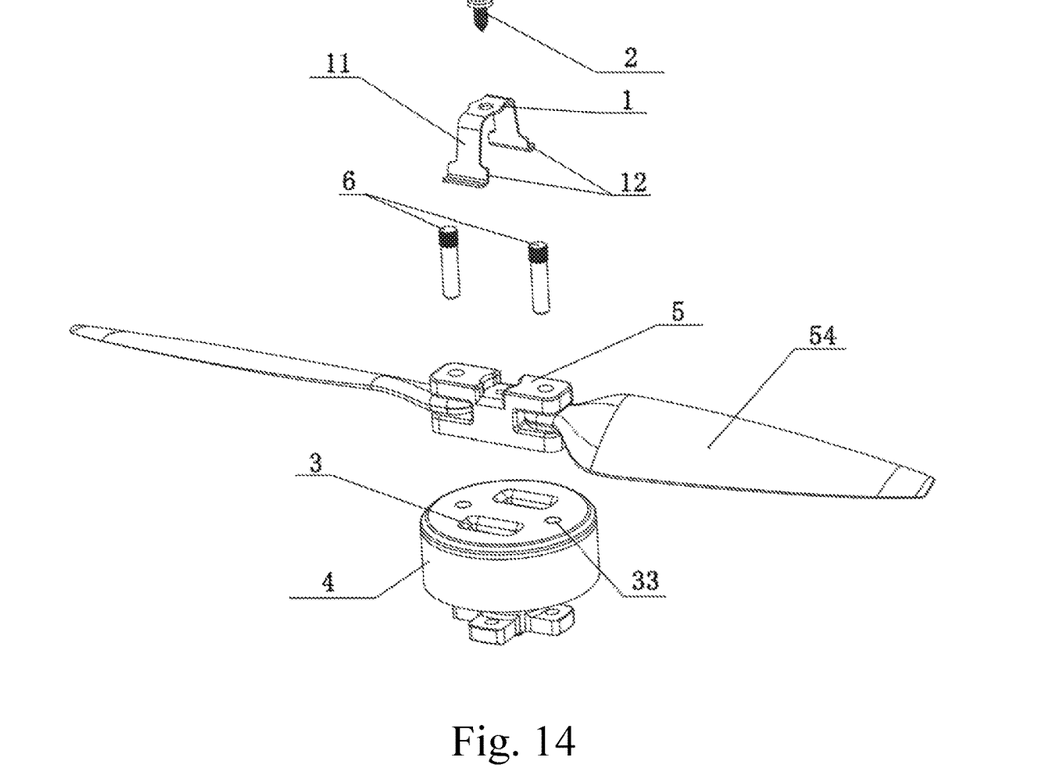
FIG. 14 is a structurally schematic view of a detachable propeller holder device according to a third embodiment of the present invention.

FIG. 14 is a structurally schematic diagram of a propeller holder device according to a third embodiment of the present invention. The structure and the principle of the third embodiment are as same as those of the first embodiment and the second embodiment, all of which utilize the buckling component 1 and the limit portions 32 of the fixed seat 3 to achieve locking or unlocking.

In the first embodiment, the buckling component 1 and the propeller holder module 5 are integrally formed; but in the third embodiment, the buckling component 1 is fixed to a top portion of the propeller holder module 5 through screws or other fixing manners, which is illustrated through taking screws as an example in the drawings.

Figure 15:
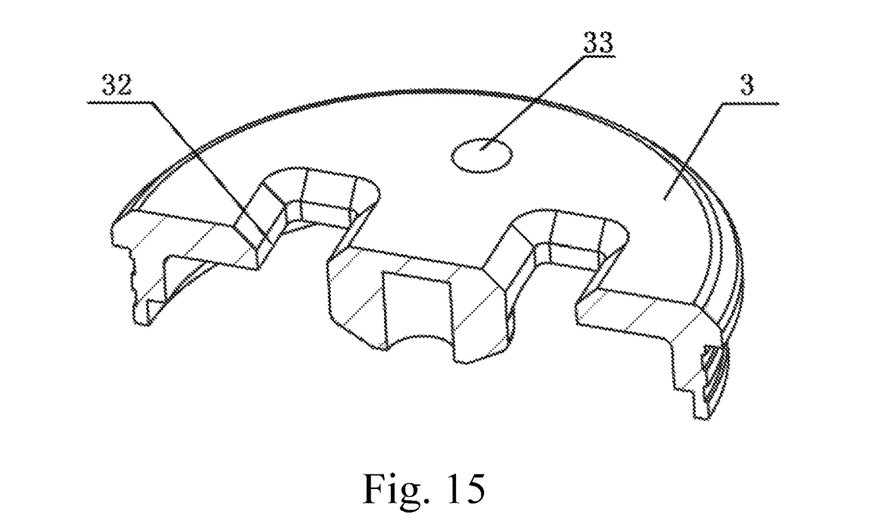
FIG. 15 is a sectional view of a fixed seat according to the third embodiment of the present invention.

Different from the motor module provided by the first embodiment and the second embodiment, the motor module 4 provided by the third embodiment is fixed with the fixed seat 3 in a press-fit manner, as shown in FIG. 15, the fixed seat acts as a motor end cover, that is, when the motor module 4 is manufactured, the motor end cover is independently manufactured, and then in press fit with a motor body; and at this time, characteristics which are similar to the limit portions 32 of the fixed seat 3 are obtained through processing the motor end cover, so that the motor end cover is used as the fixed seat. Simultaneously, there are the limit portions 32 for limiting the hooks of the propeller holder module on the fixed seat. The fixed seat 3 has screw holes 33, and two paddle fixed shafts 6 respectively pass through the paddles 54 located on the propeller holder module 5 to be screwed with the screw holes 33, so as to fix the propeller holder module 5 with the motor module 4. In the third embodiment, the paddle fixed shafts 6 play a role not only in fixing the paddles 54 but fixing and limiting the whole structure. A motor of the motor module drives the fixed seat to rotate for driving the propeller holder module to rotate.

Figure 16:
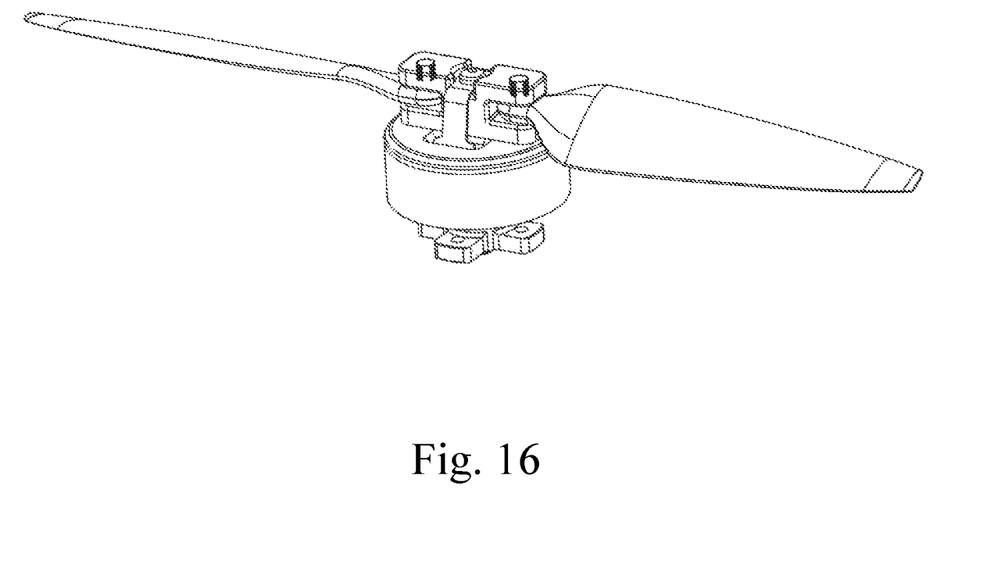
FIG. 16 is a structurally schematic diagram of the detachable propeller holder device after being assembled according to the third embodiment of the present invention.

While the propeller holder module 5 is installed, the paddle fixed shafts 6 firstly pass through the paddles 54 located on the propeller holder module 5 respectively, the paddles 54 are fixed with the propeller holder module 5, and then the paddle fixed shafts 6 respectively pass through the paddles 54 for fixing the paddle fixed shafts 6 with the screw holes 33 in the fixed seat 3. Since the propeller holder module 5 is fixed with the buckling component 1, the elastic arms 1 at the sides of the buckling component 1 are pressed to deform at a certain degree till the hooks 12 are buckled with the limit portions 32 of the fixed seat 3 in position; and at this time, the cooperation between the hooks 12 and the limit portions 32 of the fixed seat 3 is able to limit the propeller holder module 5 to move upwardly and downwardly. FIG. 16 is a schematic view of the present invention after being assembled. When the present invention is disassembled, as same as the first embodiment and the second embodiment, the elastic arms 11 at the sides of the propeller holder module 5 are pinched to deform inwardly for detaching the hooks 12 from the limit portions 32, and then the propeller holder module 5 is pulled upwardly to be removed.

Obviously, those skilled in the art can make various modifications and variations to the present invention without departing from the spirit and scope of the present invention. In this way, if these modifications and variations of the present invention fall within the scope of the claims of the present invention and its equivalent technologies, the present invention is also intended to include these modifications and variations.

What is claimed is:

1. A detachable propeller holder device for a UAV (unmanned aerial vehicle), comprising a propeller holder module, a fixed seat and a motor module, wherein paddles and a buckling component are located on the propeller holder module, the buckling component comprises two elastic arms and two hooks, the two elastic arms are symmetrically located at two sides of the propeller holder module, the hooks are respectively located at an end of the two elastic arms and are respectively buckled with two limit portions which are symmetrically located at the fixed seat, so as to fix the propeller holder module to an upper portion of the fixed seat.

2. The detachable propeller holder device, as recited in claim 1, wherein the propeller holder module has a fixed hole, and the buckling component is installed to the fixed hole through a screw.

3. The detachable propeller holder device, as recited in claim 1, wherein the motor module is fixed with the fixed seat through a press-fit manner, the fixed seat has two screw holes, two paddle fixed shafts respectively pass through the paddles which are located on the propeller holder module to be connected with the screw holes, so as to fix the propeller holder module to the motor module, a motor of the motor module drives the fixed seat to rotate for driving the propeller holder module to rotate.

4. The detachable propeller holder device, as recited in claim 1, wherein the fixed seat has a shaft hole in a center thereof, two screw holes are symmetrically provided at two sides of the shaft hole, a motor limit shaft located in a middle of the motor module passes through the shaft hole of the fixed seat, the fixed seat is fixed to the upper portion of a motor of the motor module through the motor limit shaft via the screw holes, the motor of the motor module drives the fixed seat to rotate for driving the propeller holder module to rotate.

5. The detachable propeller holder device, as recited in claim 4, wherein the propeller holder module comprises a base body, a propeller holder upper plate and a propeller holder lower plate are respectively fixed to an upper end and a lower end of the base body, the paddles are symmetrically fixed at two sides of the base body between the propeller holder upper plate and the propeller holder lower plate.

6. The detachable propeller holder device, as recited in claim 5, wherein the propeller holder lower plate has a limit hole which matches with the motor limit shaft of the motor module, the motor limit shaft passes through the fixed seat and the propeller holder lower plate in turn and is fixed to the base body.

7. The detachable propeller holder device, as recited in claim 5, wherein a center which passes through the propeller holder upper plate and the propeller holder lower plate has a limit hole which matches with the motor limit shaft of the motor module, the motor limit shaft passes through the fixed seat, the propeller holder lower plate and the propeller holder upper plate in turn and is fixed to the base body.

* * * * *